(12) United States Patent
Ingman et al.

(10) Patent No.: US 7,433,830 B2
(45) Date of Patent: Oct. 7, 2008

(54) METHOD AND SYSTEM FOR ASSIGNING AND DISPATCHING A TELECOMMUNICATIONS SYSTEMS WORK ORDER BASED ON GLOBAL POSITIONING INFORMATION

(75) Inventors: Robert M. Ingman, Peach Tree City, GA (US); Charlie Garris, Peach Tree City, GA (US); Charles E Reddick, Palatka, FL (US); Robert A. Cole, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1215 days.

(21) Appl. No.: 10/175,123

(22) Filed: Jun. 19, 2002

(65) Prior Publication Data

US 2004/0111312 A1 Jun. 10, 2004

(51) Int. Cl.
G06F 17/60 (2006.01)
(52) U.S. Cl. ................ 705/9; 342/357.13; 379/9.02
(58) Field of Classification Search .................. None
See application file for complete search history.

(56) References Cited

U.S. PATENT DOCUMENTS

| | | | |
|---|---|---|---|
| 5,881,131 A * | 3/1999 | Farris et al. .......... 379/15.03 |
| 5,920,846 A | 7/1999 | Storch et al. | |
| 5,943,652 A | 8/1999 | Sisley et al. | |
| 6,085,166 A | 7/2000 | Beckhardt | |
| 6,169,517 B1 * | 1/2001 | Eslambolchi et al. .. 342/357.13 |
| 6,272,457 B1 * | 8/2001 | Ford et al. ............... 704/9 |
| 6,611,751 B2 * | 8/2003 | Warren ................. 701/200 |
| 6,873,949 B2 * | 3/2005 | Hickman et al. ......... 704/9 |
| 6,990,458 B2 * | 1/2006 | Harrison et al. .......... 705/8 |
| 7,003,475 B1 | 2/2006 | Friedland et al. | |
| 7,107,285 B2 * | 9/2006 | von Kaenel et al. ..... 707/104.1 |
| 7,340,037 B1 | 3/2008 | Jean et al. | |
| 2002/0010615 A1 | 1/2002 | Jacobs | |
| 2002/0029161 A1 | 3/2002 | Brodersen et al. | |
| 2002/0032028 A1 * | 3/2002 | Kaupe ................... 455/427 |
| 2002/0035460 A1 * | 3/2002 | Hales .................... 703/13 |
| 2002/0054082 A1 * | 5/2002 | Karpf ................... 345/738 |
| 2003/0204431 A1 | 10/2003 | Ingman | |

OTHER PUBLICATIONS

Software Systems for Telecommunications, Science and Technology Series, Bell Communications Research, Oct. 1992, [retrieved from application file U.S. Appl. No. 08/608,838], pp. 34, 35, 53, 54, 58, 82, 83, 87, 93, 99, 100, 111-114, 139, 145, 146, 152, 153, 164.*

(Continued)

*Primary Examiner*—Beth V. Boswell
*Assistant Examiner*—Dave Robertson
(74) *Attorney, Agent, or Firm*—Scott P. Zimmerman, PLLC

(57) ABSTRACT

Methods and systems are disclosed for enhancing telephone work orders with Global Positioning System information. One method generates a work order for repair of a telecommunications network. A turf is assigned to the work order, and the assigned turf is verified with a wire center. The work order is then dispatched for repair of the telecommunications network.

14 Claims, 7 Drawing Sheets

OTHER PUBLICATIONS

First User Documentation, Southwestern Bell Telephone Company, Dec. 1995, Index, pp. 1-3, Section 1, p. 1, Section 2, pp. 1-2 [retrieved from application file U.S. Appl. No. 08/608,838.*

"13 Step System Flow" and Additional information, training memorandum prepared by Southwestern Bell Center Of Learning, approximately 1992 (first public availability Jul. 6, 1999) [retrieved from application file U.S. Appl. No. 08/608,838].*

Rey, R.F., Engineering and Operations in the Bell System, AT&T Bell Laboratories, Murray Hill, NJ, 1984, pp. 605-621.*

Lesaint et al. "Dynamic Workforce scheduling for British Telecommunications" Informs. Jan.-Feb. 2000.

Marmel, Microsoft Project 2000 Bible, Mar. 30, 2000, IDG Books Worldwide, Inc., p. 42-47, & 120.

* cited by examiner

| wireCenter | aa | clli_cd | lat | lon |
|---|---|---|---|---|
| 205221 | 1101 | JSPRALMT | 33.848729 | -87.272363 |
| 205221 | 1102 | JSPRALMT | 33.849716 | -87.278076 |
| 205221 | 1104 | JSPRALMT | 33.848561 | -87.267839 |
| 205221 | 1105 | JSPRALMT | 33.855488 | -87.265228 |
| 205221 | 1110 | JSPRALMT | 33.867302 | -87.266656 |
| 205221 | 1111 | JSPRALMT | 33.878182 | -87.268254 |
| 205221 | 1113 | JSPRALMT | 33.901180 | -87.269562 |
| 205221 | 1122 | JSPRALMT | 33.834760 | -87.273410 |
| 205221 | 1125 | JSPRALMT | 33.841730 | -87.275080 |
| 205221 | 1127 | JSPRALMT | 33.846512 | -87.258766 |
| 205221 | 1128 | JSPRALMT | 33.862470 | -87.251490 |
| 205221 | 1130 | JSPRALMT | 33.846550 | -87.258620 |
| 205221 | 1132 | JSPRALMT | 33.877772 | -87.244612 |
| 205221 | 1134 | JSPRALMT | 33.869820 | -87.241900 |
| 205221 | 1144 | JSPRALMT | 33.876671 | -87.234451 |
| 205221 | 1192 | JSPRALMT | 33.849498 | -87.270771 |
| 205221 | 1193 | JSPRALMT | 33.853493 | -87.273385 |
| 205221 | 1212 | JSPRALMT | 33.983058 | -87.182686 |
| 205221 | 1214 | JSPRALMT | 33.975430 | -87.162552 |
| 205221 | 1222 | JSPRALMT | 33.905599 | -87.226536 |
| 205221 | 1231 | JSPRALMT | 33.921143 | -87.249458 |
| 205221 | 1233 | JSPRALMT | 33.926205 | -87.238983 |
| 205221 | 1235 | JSPRALMT | 33.940880 | -87.221195 |
| 205221 | 1239 | JSPRALMT | 33.959664 | -87.213669 |
| 205221 | 1304 | JSPRALMT | 34.111427 | -87.200912 |
| 205221 | 1311 | JSPRALMT | 34.009678 | -87.142717 |
| 205221 | 1314 | JSPRALMT | 34.062377 | -87.174201 |
| 205221 | 1390 | JSPRALMT | 34.045376 | -87.222443 |
| 205221 | 1391 | JSPRALMT | 34.070645 | -87.217529 |
| 205221 | 1392 | JSPRALMT | 34.020797 | -87.173464 |
| 205221 | 1394 | JSPRALMT | 33.890610 | -87.281360 |
| 205221 | 2103 | JSPRALMT | 33.830750 | -87.271870 |
| 205221 | 2106 | JSPRALMT | 33.840580 | -87.234230 |
| 205221 | 2108 | JSPRALMT | 33.835806 | -87.221827 |
| 205221 | 2109 | JSPRALMT | 33.840580 | -87.234230 |
| 205221 | 2112 | JSPRALMT | 33.842185 | -87.211456 |
| 205221 | 2113 | JSPRALMT | 33.846096 | -87.199074 |

METHOD AND SYSTEM FOR ASSIGNING AND DISPATCHING A TELECOMMUNICATIONS SYSTEMS WORK ORDER BASED ON GLOBAL POSITIONING INFORMATION

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computers and to telecommunications and, more particularly, to methods and systems for verifying an assigned turf is appropriate for a wire center.

2. Description of the Related Art

When a telecommunications network requires repair, a work order may sometimes be categorized as an "exact wrong match." An "exact wrong match" describes a work order that gets assigned to a wrong turf. The wrong turf gets assigned because the work order has a street address that is valid for more than one turf. Because the street address is valid for more than one turf, a technician may be dispatched to the wrong turf. Any repair is then delayed while the work order is re-routed to the proper technician.

"Exact wrong matches" usually occur after truncation. As the work order electronically flows from creation to dispatch, the work order includes a street address associated with the telephone number experiencing a problem. This street address, however, often has too many characters for the street address field in computer programs. A computer program then truncates the address to the size of the street address field. A long street address, such as 1675 West Peachtree Street N.E., Suite 100, Sandy Springs, Ga., is then truncated to "1675 West Peachtree." The remaining street, suite, and city portion of the street address ("N.E. Suite 100, Sandy Springs") is removed to fit the street address field. (BellSouth's work order source system, for example, truncates addresses after twenty characters). The street address remaining after truncation, "1675 West Peachtree," may be a valid street address in more than one area. Because the address is truncated, a wrong turf gets assigned to the truncated street address.

There is, accordingly, a need in the art for methods and systems that reduce the occurrence of exact wrong matches, methods and systems that help ensure an assigned turf is appropriate for an address, and methods and systems that operate within the existing telecommunications network computer architecture.

BRIEF SUMMARY OF THE INVENTION

The aforementioned problems are reduced by an enhanced Integrated Dispatch System. The Integrated Dispatch System comprises computer programs and computer systems that manage dispatch of work orders in a telecommunications network. This invention allows the Integrated Dispatch System to assign a turf to a work order, and then validate that the assigned turf is appropriate to the street address and/or phone number. If the turf is correctly assigned, then the work order is dispatched to the field. If, however, the turf is not correctly assigned, then the Integrated Dispatch System further validates that a latitude and longitude for an allocation area assigns the correct turf to the work order. This invention, therefore, reduces the occurrence of exact wrong matches and improves the response time for repairs of telecommunications networks.

An embodiment describes a method for enhancing work orders with Global Positioning System information. A "work order" describes some type of trouble with a telecommunications network. An electronic work order is generated, and the work order is associated with a telephone number. The telephone number, in turn, is associated with a wire center. A turf is assigned to the work order, and this embodiment verifies that the assigned turf is appropriate for the wire center. The term "turf," as used herein, denotes a geographic area within a telecommunications network. A turf could be a territory, a wire center, the boundary of one or more wire centers, or a portion of a wire center. A turf could also be a composite of geographic areas, and the geographic areas may or may not be contiguous. After the turf is assigned and verified, the work order is then electronically dispatched to repair the telecommunications network.

Another embodiment also describes a method for enhancing work orders with Global Positioning System information. A turf is assigned to an electronic work order. The work order describes trouble with the telecommunications network, and the work order is associated with a telephone number, a wire center, and an allocation area. This embodiment verifies that the assigned turf is within the wire center. If the assigned turf is not within the wire center, then this embodiment verifies that the allocation area is within the assigned turf. An "allocation area" is a smaller geographic area within the turf. A wire center contains one or more turfs, and each turf contains one or more allocation areas. If the allocation area is within the assigned turf, then a latitude and a longitude are assigned to the work order. The latitude and longitude are associated with the allocation area. The latitude and the longitude, for example, could locate a geographic center of the allocation area. The work order is electronically dispatched for repair of the telecommunications network.

Still another embodiment describes a computer system for enhancing work orders. The system has an Integrated Dispatch System stored in a memory device. The Integrated Dispatch System manages dispatch of a work order for a telecommunications network. The work order is associated with a wire center. The Integrated Dispatch System assigns a turf to the work order and verifies that the assigned turf is appropriate for the wire center. A processor communicates with the memory device and executes coded, executable instructions.

BRIEF DESCRIPTION OF THE SEVERAL VIEWS OF THE DRAWINGS

These and other features, aspects, and advantages of this invention are better understood when the following Detailed Description of the Invention is read with reference to the accompanying drawings, wherein:

FIG. 3 is a screenshot of a map of wire centers and turfs;

FIG. 5 is a screenshot of a map of Global Positioning System information.

DETAILED DESCRIPTION OF THE INVENTION

Figure 1:
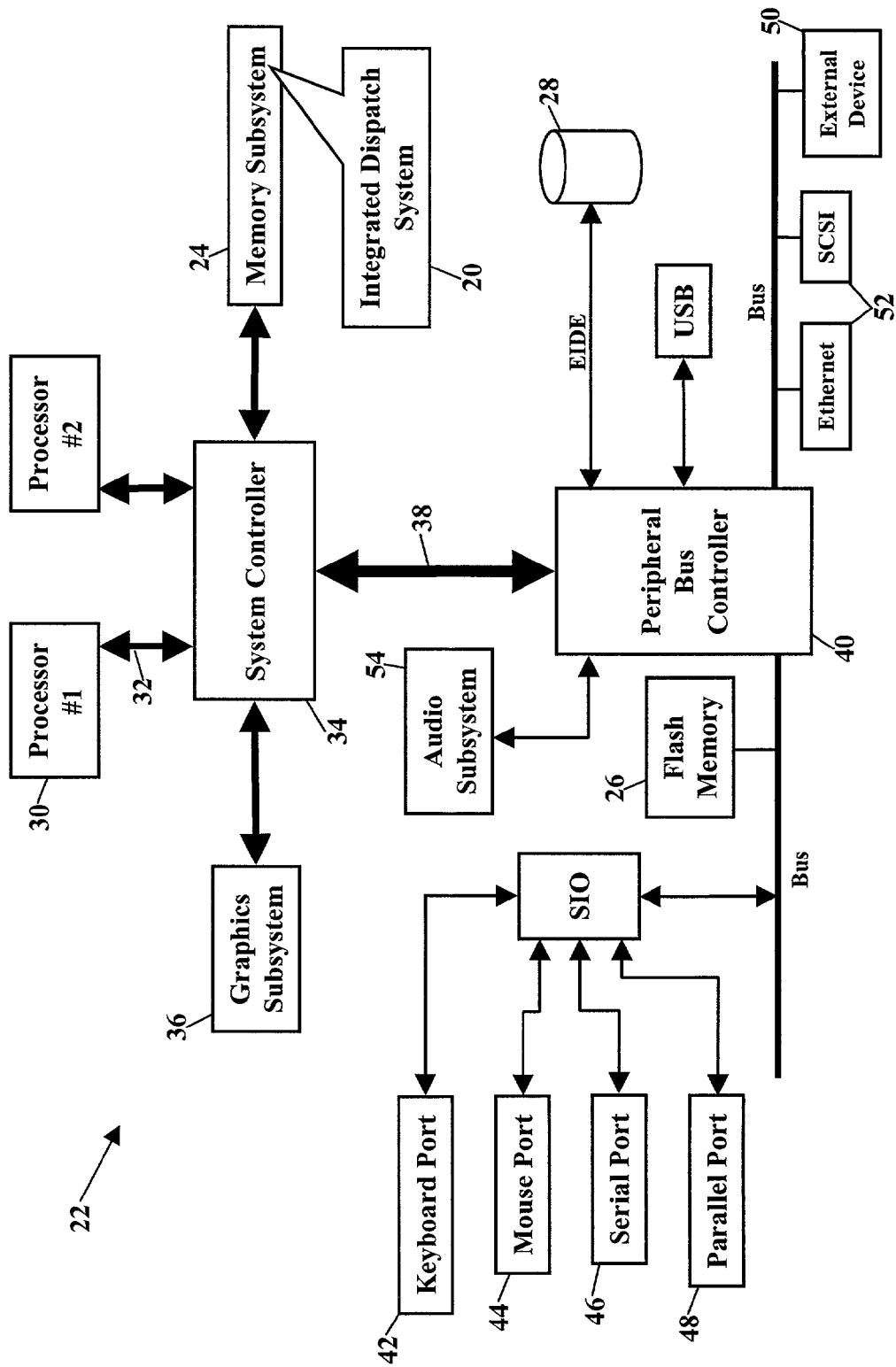
FIG. 1 is a block diagram showing an embodiment of the Integrated Dispatch System that resides in a computer system.

FIG. 1 depicts one possible operating environment for an embodiment of this invention. This embodiment of an Integrated Dispatch System 20 includes a computer program that verifies that turfs are properly assigned to work orders. If the assigned turf is within the wire center of the telephone number, then the turf is appropriately assigned and the work order is dispatched. If the turf is not correctly assigned, then the Integrated Dispatch System 20 verifies that an allocation area is within the turf. When the allocation area is within the assigned turf, the Integrated Dispatch System 20 assigns Global Positioning System information to the work order.

FIG. 1 is a block diagram showing the Integrated Dispatch System 20 residing in a computer system 22. The Integrated Dispatch System 20 operates within a system memory device. The Integrated Dispatch System 20, for example, is shown residing in a memory subsystem 24. The Integrated Dispatch System 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

The central processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). Sun Microsystems also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is a UNIX®-based system (UNIX® is a registered trademark of The Open Group, 44 Montgomery Street, Suite 960, San Francisco, Calif. 94104, 415.374.8280, www.opengrogp.org). Other operating systems, however, are also suitable. Such other operating systems would include WINDOWS® (WINDOWS® is a registered trademark of Microsoft Corporation, One Microsoft Way, Redmond Wash. 98052-6399, 425.882.8080, www.Microsoft.com). WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

Figure 2:
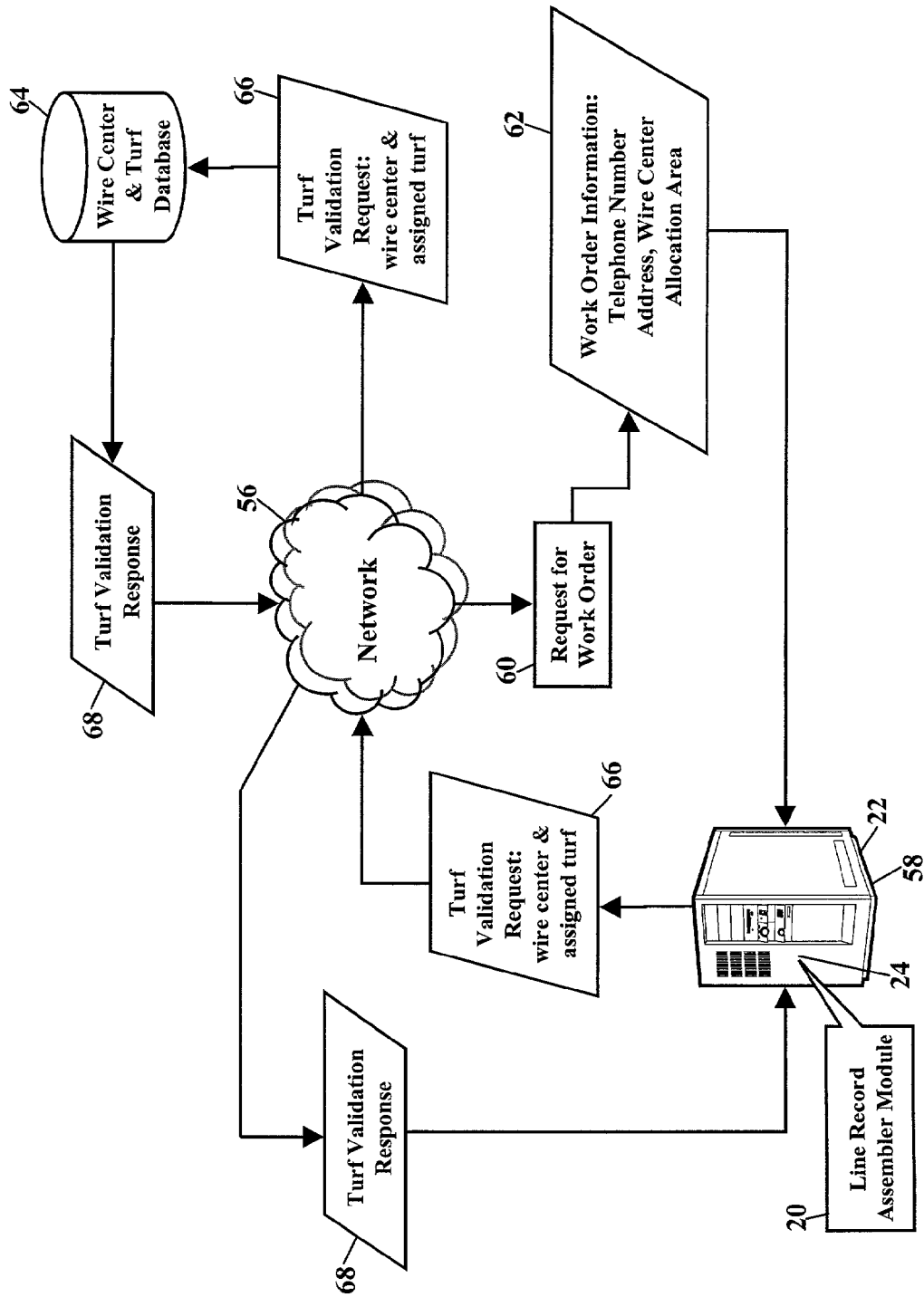
FIG. 2 is a block diagram further illustrating an operating environment for the Integrated Dispatch System.

FIGS. 2-5 are block diagrams further illustrating an operating environment for the Integrated Dispatch System 20. As FIG. 2 shows, the Integrated Dispatch System 20 is a computer program that acquires information from a data network 56 using a data-transfer protocol (such as TCP/IP). The Integrated Dispatch System 20 then uses this information to dispatch the work order. The Integrated Dispatch System 20 operates within the memory subsystem 24 of the computer system 22. (The Integrated Dispatch System 20, however, could also reside in flash memory 26 or peripheral storage device 28, shown, respectively, as reference numerals 26 and 28 in FIG. 1.) The computer system 22 is shown as a server 58. The computer system 22, and thus the Integrated Dispatch System 20, receives a request 60 for a work order. The request 60 for the work order is received from the data network 56. The request 60 for the work order may originate from some user at another computer (not shown for simplicity) communicating with the network 56. The request 60 for the work order may also originate from some application or host running on another computer (again not shown for simplicity) communicating with the network 56. The request 60 for the work order contains work order information 62. The work order information 62 includes a telephone number for which the work order is required, a service address associated with the telephone number, a wire center associated with the telephone number, and one or more allocation areas within the wire center. The Integrated Dispatch System 20 receives the request 60 for the work order and prepares the work order for dispatch.

FIG. 2 also shows a turf validation scheme. The request 60 for the work order contains the work order information 62, such as the telephone number, service address, wire center, and allocation area associated with the telephone number. Before the work is dispatched, however, the Integrated Dispatch System 20 assigns a turf to the work order. Because each wire center is composed of one or more turfs, this invention helps ensure that the assigned turf lies within, or is associated with, the wire center. If the assigned turf does not lie within the wire center, the wrong technician will be assigned to the work order and the repair will be delayed.

The Integrated Dispatch System 20, therefore, queries a wire center & turf database 64. The wire center & turf database 64 stores a listing of wire centers and the turfs that lie within, or are associated with, each wire center in the listing. The Integrated Dispatch System 20 sends a turf validation request 66 to the wire center & turf database 64. The turf validation request 66 includes the information representing the wire center and the assigned turf. The wire center & turf database 64 receives the turf validation request 66. The wire center & turf database 64 consults a matrix of wire centers and turfs to ensure the assigned turf lies within, or is associated with, the wire center. The wire center & turf database 64 then sends a turf validation response 68 over the network 56 to the Integrated Dispatch System 20. The Integrated Dispatch System 20 acquires the turf validation response 68 and determines whether to proceed with dispatch. If the assigned turf is appropriate for the wire center, the turf validation response 68 has an affirmative indication or response, so the Integrated Dispatch System 20 proceeds and dispatches the work order.

Figure 3:
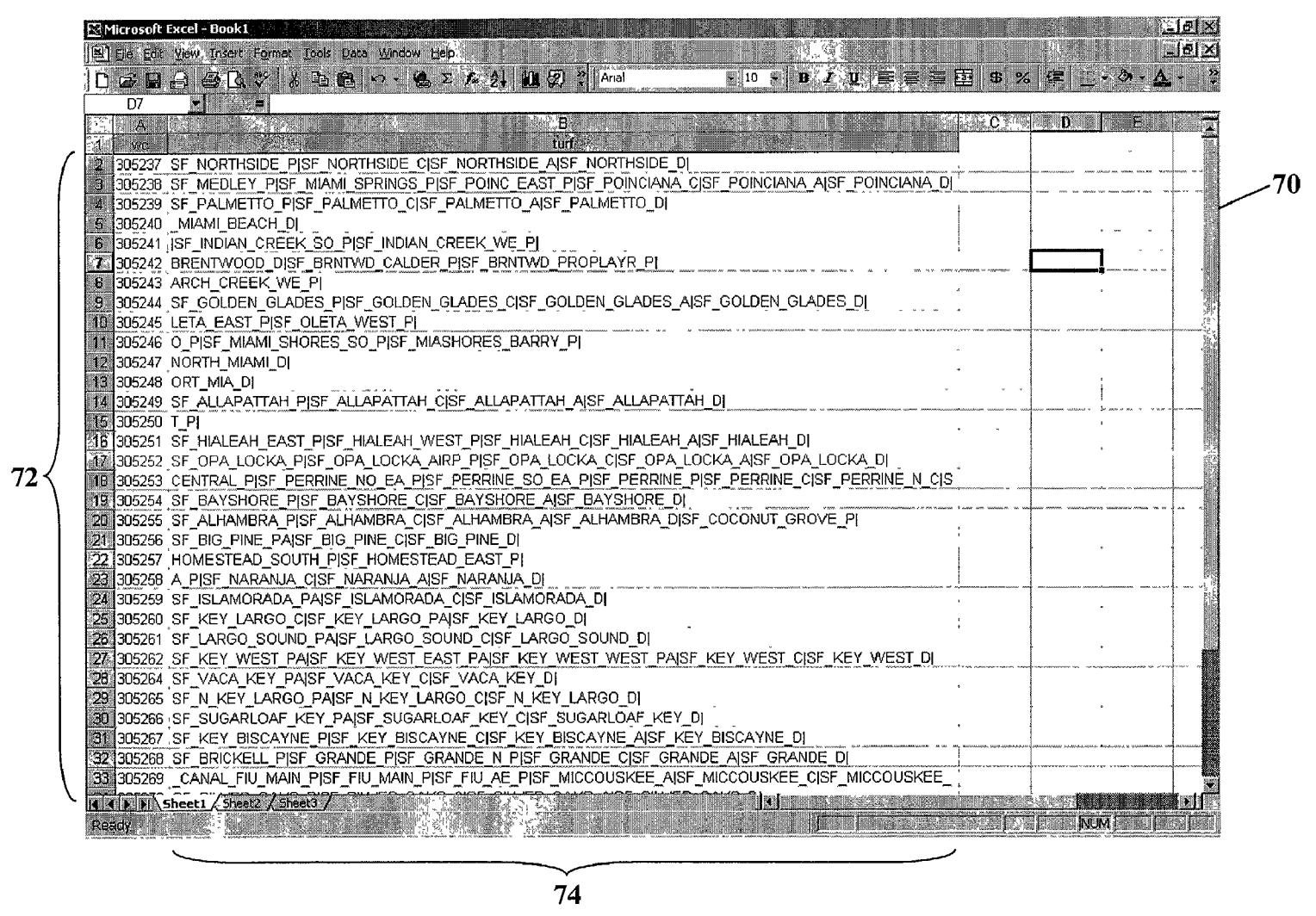

FIG. 3 is a screenshot of a map 70 of wire centers and turfs. The map 70 of wire centers and turfs includes a listing 72 of wire centers and a listing 74 of turfs for each wire center. The turf validation request (shown as reference numeral 66 in FIG. 2) includes the wire center and the assigned turf. When the wire center & turf database (shown as reference numeral 64 in FIG. 2) receives the turf validation request, the wire center & turf database consults the map 70 of wire centers and turfs. If the assigned turf lies within, or is associated with, the wire center, the turf validation response (shown as reference numeral 68 in FIG. 2) has an affirmative indication or response. Because the turf validation response is affirmative, the Integrated Dispatch System (shown as reference numeral 20 in FIGS. 1 and 2) then proceeds and dispatches the work order.

When the assigned turf is not validated to the wire center, Global Positioning Information gets assigned to the work order. If the Integrated Dispatch System cannot validate the assigned turf to the wire center, using the map 70 of wire centers and turfs, then the turf validation response has a negative indication or response. A negative indication or response means the assigned turf does not lie within the wire center. A negative indication or response could also mean the assigned turf is not associated with the wire center. The Integrated Dispatch System then, instead, assigns Global Positioning System information to the work order. When the Integrated Dispatch System cannot assign a valid turf to the work order, the Integrated Dispatch System, instead, assigns a latitude and longitude associated with an allocation area to the work order.

Figure 4:
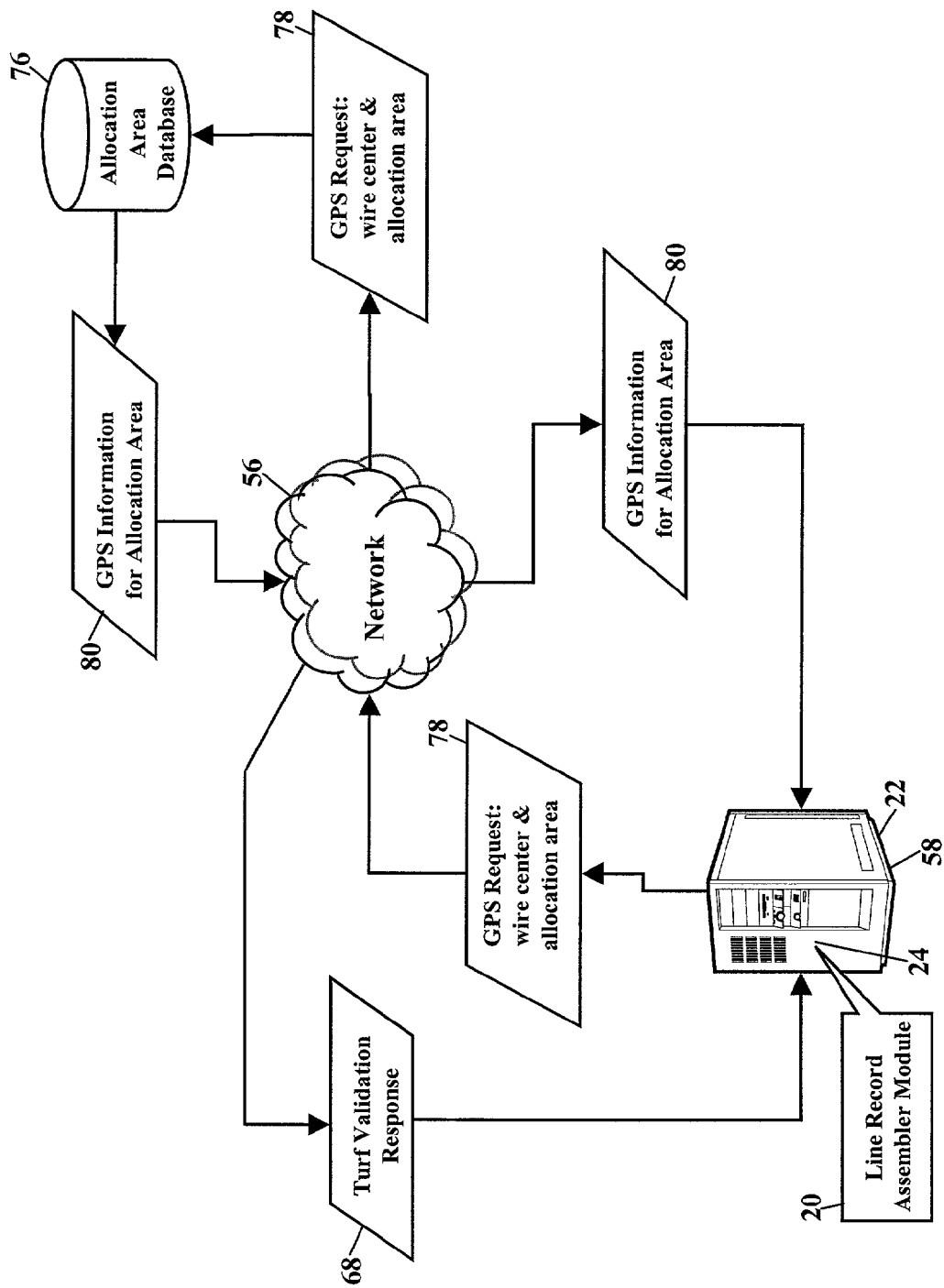
FIG. 4 is a block diagram showing a scheme for assigning Global Positioning System information to the work order.

FIG. 4 is a block diagram showing a scheme for assigning Global Positioning System information to the work order. Because the Integrated Dispatch System could not validate the assigned turf to the wire center, the turf validation response 68 was negative. The Integrated Dispatch System 20, therefore, queries an allocation area database 76. The allocation area database 76 stores a listing of wire centers and the allocation areas that lie within, or are associated with, each wire center in the listing. The allocation area database 76 also stores Global Positioning System information for each allocation area. The Integrated Dispatch System 20 sends a Global Positioning System (GPS) Request 78 to the allocation area database 76. The Global Positioning System (GPS) Request 78 includes information representing the wire center and the allocation area associated with the telephone number for which the work order is required. The allocation area database 76 receives the Global Positioning System (GPS) Request 78. The allocation area database 76 consults a matrix of wire centers and the corresponding allocation areas. The allocation area database 76 then sends Global Positioning System (GPS) information 80 over the network 56 to the Integrated Dispatch System 20. The Integrated Dispatch System 20 acquires the Global Positioning System (GPS) information 80 and assigns the Global Positioning System location coordinates to the work order. The Integrated Dispatch System 20 then proceeds and dispatches the work order.

The Global Positioning System (GPS) information 80 preferably defines a location for the allocation area. The Global Positioning System (GPS) information 80, for example, could define the geographic center of the allocation area or some reference point within the allocation area. The Global Positioning System (GPS) information 80 could also define the location of an intersection of two or more streets, define the location of a landmark, or define the location of a building within the allocation area. The Global Positioning System (GPS) information 80 could alternatively define the location of a telecommunications network facility, such as a service terminal, a cross-connect box, a utility pole, a central office, or any other facility within the allocation area.

FIG. 5 is a screenshot of a map 82 of Global Positioning System information. The map 82 of Global Positioning System information includes a listing 84 of wire centers, a listing 86 of allocation areas for each wire center, and Global Positioning System location coordinates 88 for each allocation area. When the Integrated Dispatch System sends the Global Positioning System (GPS) Request (shown as reference numeral 78 in FIG. 4), the Global Positioning System (GPS) Request includes the wire center and the allocation area associated with the telephone number for which the work order is required. The allocation area database 76 consults the matrix 82 of Global Positioning System information and retrieves the Global Positioning System (GPS) location coordinates for the allocation area. The Integrated Dispatch System acquires the Global Positioning System (GPS) information (shown as reference numeral 80 in FIG. 4) and assigns the Global Positioning System location coordinates to the work order. The Integrated Dispatch System then proceeds and dispatches the work order.

The Global Positioning System location coordinates 88 are shown in FIG. 5 as latitude ("lat") and longitude ("lon"). The Global Positioning System location coordinates 88 are preferably expressed as latitude, longitude, and, if needed, elevation. The latitude, the longitude, and the elevation (or height) would help technicians precisely locate a point within the allocation area. The Global Positioning System information 80, therefore, could describe the location of the geographic center of the allocation area. The Global Positioning System information 80 could also describe the location of customer's service address, a terminal serving the customer, a cross-connect box serving the customer, and/or a central office serving the customer. The Global Positioning System information 80 could also describe the any desired location within an allocation area or within a turf associated with the telephone number. The Global Positioning System information 80 could alternatively be expressed in any x, y, and z coordinate value (such as feet, meters, miles, or kilometers). The Global Positioning System information 80 could also be expressed as position, velocity, and time coordinates, however, latitude, longitude, and elevation are more readily understood. Because the principals of satellite-based navigation are well understood, the Global Positioning System will not be further discussed. If the reader desires a more detailed explanation of the Global Positioning System, the National Aeronautical and Space Administration offers several tutorials and background papers. See http://leonardo.jpl.nasa.gov/msl/Programs/gps.html.

Figure 6:
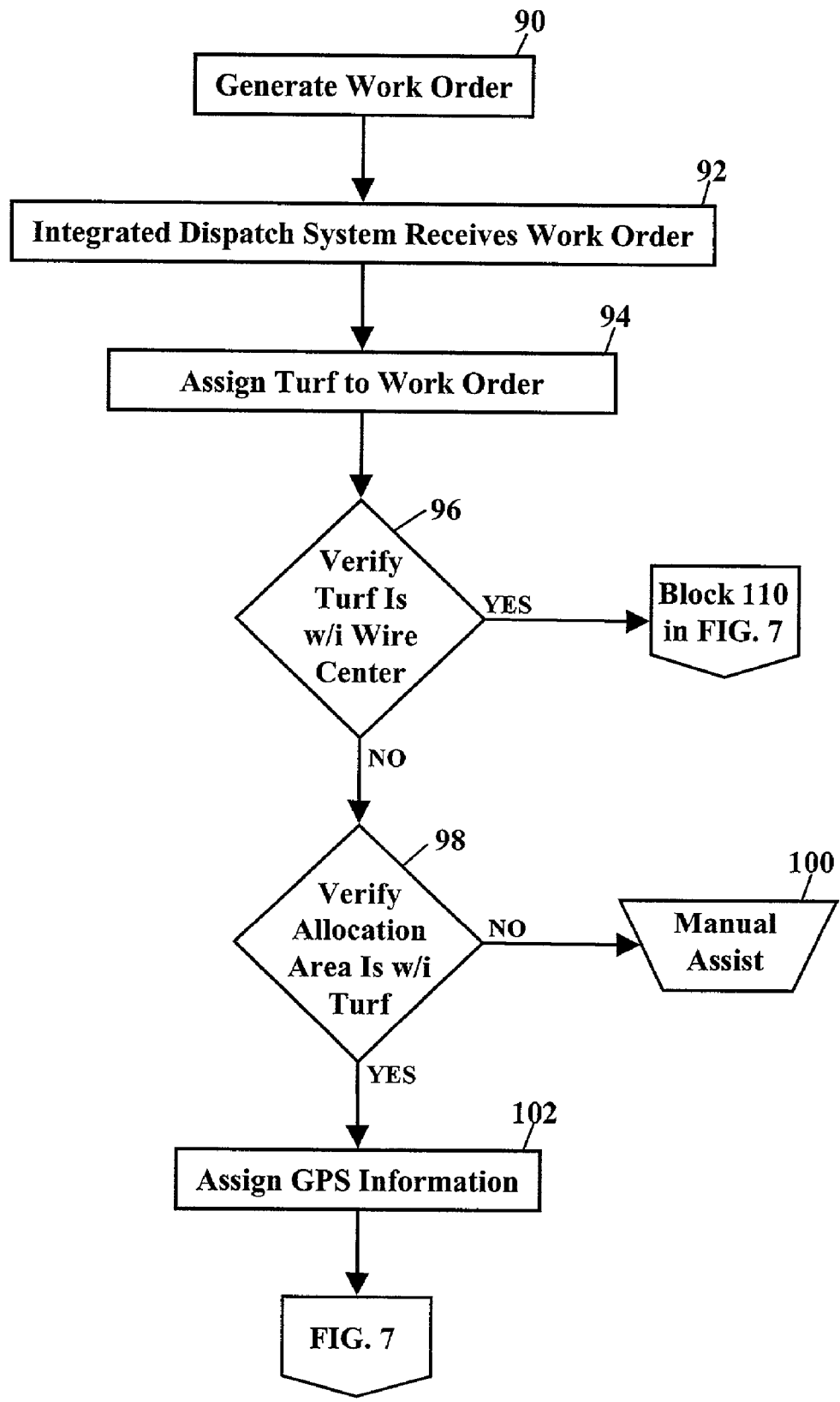
FIGS. 6 and 7 are flowcharts showing one method for dispatching telephone work orders.
Figure 7:
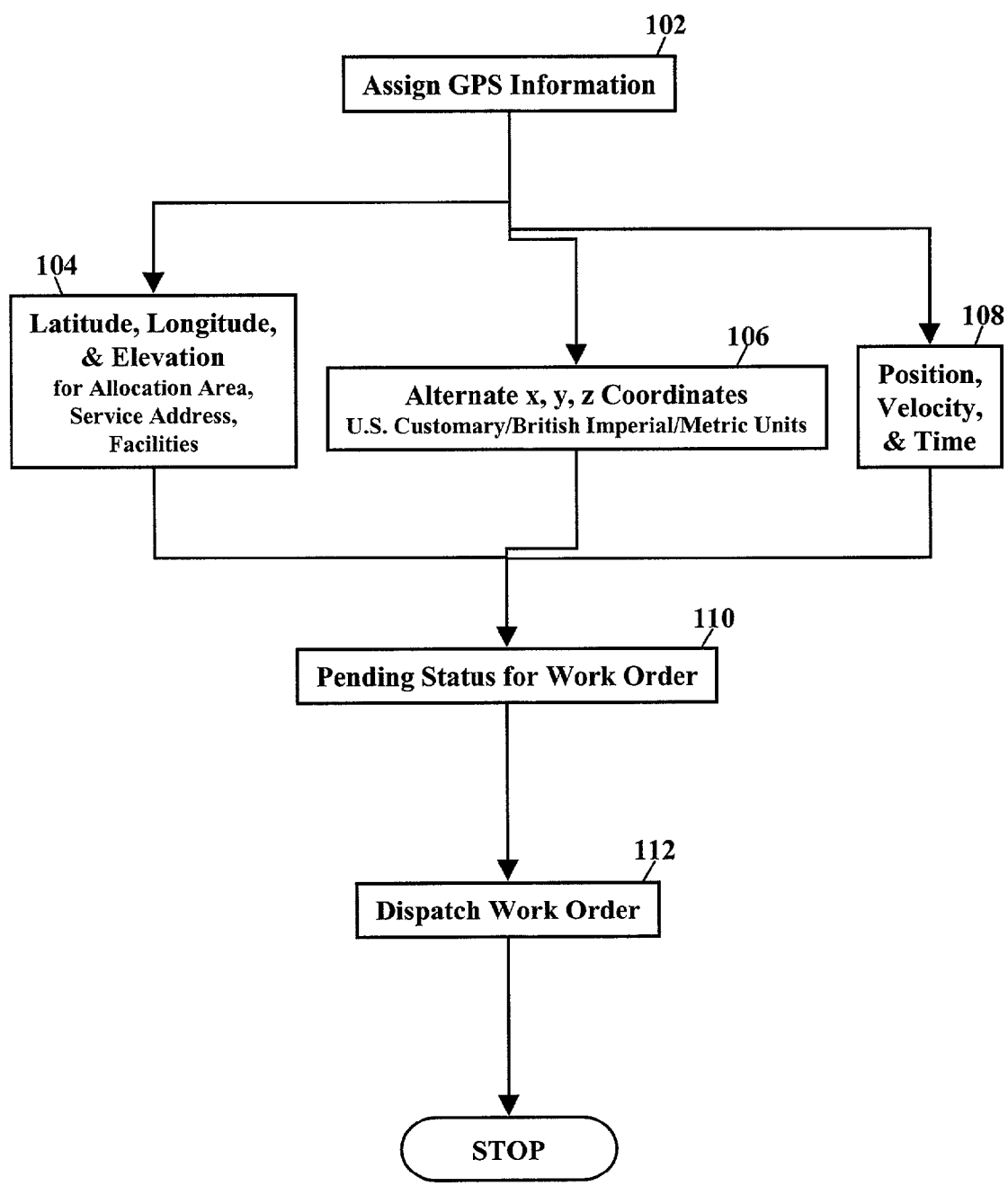

FIGS. 6 and 7 are flowcharts showing one method for dispatching telephone work orders. A work order is generated (Block 90). The work order describes trouble with a telecommunications network, and the work order is often associated with the customer's telephone number. The customer's telephone number is also associated with a wire center, so the work order is also associated with the wire center. The term "wire center" indicates a local terminating point for telephone wires, switches, and other telecommunications devices. A wire center might contain one or more switching systems and a facility junction, such as a distributing frame or a cross-connect box. A wire center, in geographic terms, is the theoretical centroid, or center of mass, of all telephones to be served within an exchange or wire center area. After the work order is generated, the Integrated Dispatch System receives the work order (Block 92).

The Integrated Dispatch System manages dispatch of work orders in a telecommunications network. The Integrated Dispatch System receives the work order and electronically dispatches the work order. The Integrated Dispatch System knows which technicians are available and the particular skills of each technician. The Integrated Dispatch System prioritizes multiple work orders, and the Integrated Dispatch System matches the proper technician to the problem or to a particular geographic area. While there are several Integrated Dispatch Systems known in the art, the TELCORDIA™ FORCE™ Integrated Dispatch System is preferred (TELCORDIA™ and FORCE™ are trademarks of Telcordia Technologies, Inc., 445 South St., Morristown N.J. 07960, www-.telcordia.com).

Once the work order is received, a turf is assigned to the work order (Block 94). Before dispatching the work order, however, the Integrated Dispatch System verifies that the assigned turf is within the wire center (Block 96). If the assigned turf is within the wire center, then the work order moves to a pending status (see Block 110 shown in FIG. 7) in preparation for dispatch. If the assigned turf is not within the wire center, then the Integrated Dispatch System verifies that the allocation area is within the assigned turf (Block 98). If the allocation area is not within the assigned turf, then the work order is not a candidate for dispatch and must be manually assisted (Block 100) to determine the proper dispatch. If, however, the allocation area is within the assigned turf, then the Integrated Dispatch System assigns Global Positioning System (GPS) information to the work order (Block 102).

The method for dispatching telephone work orders continues with the flowchart shown in FIG. 7. When the allocation area is within the assigned turf, the Integrated Dispatch System assigns Global Positioning System (GPS) information to the work order (Block 102). The Global Positioning System (GPS) information is, preferably, a latitude and a longitude associated with the allocation area (Block 104). The Global Positioning System (GPS) information could also include an elevation or height, if desired. The latitude and longitude, for example, could be the geographic center of the allocation area or some reference point within the allocation area. The latitude and longitude could also define the location of an intersection, a building, or a landmark. The latitude and longitude could also define the location of telecommunications network facilities, such as a service address, a cross-connect box, a service terminal, and/or a central office associated with the telephone number. The Global Positioning System (GPS) information could also include alternative x, y, and z coordinates (Block 106) for the service address, for the cross-connect box, for the service terminal, for the wire center, and/or for the central office associated with the telephone number. These alternative x, y, and z coordinates could be expressed in U.S. Customary and British Imperial units, such as feet and miles, or in metric units, such as meters and kilometers. The Global Positioning System (GPS) information could also be expressed as position, velocity, and time measurements (Block 108) for the service address, for the cross-connect box, for the service terminal, for the wire center, and/or for the central office associated with the telephone number.

Once the Global Positioning System (GPS) information is assigned, the work order moves to a pending status (Block 110). The Integrated Dispatch System then dispatches the work order (Block 112) to a technician in the field. The technician locates the problem and repairs the telecommunications network.

The Integrated Dispatch System (shown as reference numeral 20 in FIG. 1), including the methods of the present invention, may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the this invention, allow the Integrated Dispatch System to be easily disseminated. A computer program product, for assigning turfs to work orders and for assigning Global Positioning System (GPS) information to work orders, comprises the computer-readable medium and the Integrated Dispatch System. The Integrated Dispatch System is stored on the computer-readable medium.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A system for assigning and dispatching a telecommunications systems work order based on global positioning information, comprising:

a processor in communication with a first database and a second database stored in a memory;

the first database storing a plurality of wire centers associated with a plurality of turfs of a telecommunications network;

the second database associating the plurality of wire centers to a plurality of allocation areas, each allocation area associated with global positioning system information;

the processor receiving a work order associated with a telephone number and with a truncated service address;

the processor assigning a wire center, a turf, and an allocation area to the work order based on the truncated street address;

the processor querying the first database for the wire center and for the turf and determining that the assigned turf is not associated with the assigned wire center;

the processor querying the second database for the assigned wire center;

the processor retrieving from the second database another allocation area and the global positioning system information associated with the assigned wire center;

means for assigning the global positioning system information to the work order; and means for electronically dispatching the work order to a technician based on the global positioning system information, wherein the global positioning system information comprises one of a set of coordinates comprising a latitude and longitude, xyz-Cartesian coordinates, or position, velocity, and time coordinates, for a reference location within the another allocation area, and wherein the reference location is one of an intersection of streets, a landmark, a building, or a network facility within the another allocation area.

2. The system according to claim 1, further comprising means for assigning the wire center, the turf, and the allocation area to the work order based on the telephone number.

3. The system according to claim 1, further comprising means for generating the work order.

4. The system of claim 1, further comprising means for associating the turf to a composite of geographic areas.

5. The system of claim 1, further comprising means for associating the turf to a non-contiguous composite of geographic areas.

6. The system of claim 1, further comprising means for displaying the work order.

7. The system of claim 1, further comprising means for receiving a request for the work order.

8. A computer program product comprising computer readable media storing processor-executable instructions for performing a method of assigning and dispatching a telecommunications systems work order based on global positioning information, the method comprising:

storing in a first database a plurality of wire centers associated with a plurality of turfs of a telecommunications network;

associating in a second database the plurality of wire centers to a plurality of allocation areas, each allocation area associated with global positioning system information;

receiving a work order associated with a telephone number and with a truncated service address;

assigning a wire center, a turf, and an allocation area to the work order based on the truncated street address;

querying the first database for the wire center and for the turf and determining that the assigned turf is not associated with the assigned wire center;

querying the work order for the assigned wire center;

retrieving from the second database another allocation area and the global positioning system information associated with the assigned wire center;

assigning the global positioning system information to the work order; and electronically dispatching the work order to a technician based on the global positioning system information, wherein the global positioning system information comprises one of a set of coordinates comprising a latitude and longitude, xyz-Cartesian coordinates, or position, velocity, and time coordinates, for a reference location within the another allocation area, and wherein the reference location is one of an intersection of streets, a landmark, a building, or a network facility within the another allocation area.

9. The computer program product of claim 8, further comprising instructions for assigning the wire center, the turf and the allocation area to the work order based on the telephone number.

10. The computer program product of claim 8, further comprising instructions for associating the service address with the work order.

11. The computer program product of claim 8, further comprising instructions for generating the work order.

12. The computer program product of claim 8, further comprising instructions for associating the turf to a composite of geographic areas.

13. The computer program product of claim 8, further comprising instructions for associating the turf to a non-contiguous composite of geographic areas.

14. A computer implemented method of assigning and dispatching a telecommunications systems work order based on global positioning information, comprising performing on a system having a processor and a memory the steps of the method comprising:

storing, in the memory, a first database containing a plurality of wire centers associated with a plurality of turfs of the telecommunications network;

storing, in the memory, a second database associating the plurality of wire centers to a plurality of allocation areas, each allocation area associated with global positioning system information;

the processor in communication with the memory performing the steps comprising:

receiving the work order associated with a telephone number and with a truncated service address;

assigning a wire center, a turf, and an allocation area to the work order based on the truncated street address;

querying for the wire center and for the turf and determining that the assigned turf is not associated with the assigned wire center;

querying for the assigned wire center;

retrieving another allocation area and the global positioning system information associated with the assigned wire center;

assigning the global positioning system information to the work order; and electronically dispatching the work order to a technician based on the global positioning system information, wherein the global positioning system information comprises one of a set of coordinates comprising a latitude and longitude, xyz-Cartesian coordinates, or position, velocity, and time coordinates, for a reference location within the another allocation area, and wherein the reference location is one of an intersection of streets, a landmark, a building, or a network facility within the another allocation area.

* * * * *